(12) United States Patent
Bergman

(10) Patent No.: US 6,626,237 B2
(45) Date of Patent: Sep. 30, 2003

(54) HEAT RECOVERY APPARATUS AND METHOD OF MINIMIZING FOULING IN A HEAT RECOVERY APPARATUS

(75) Inventor: Ted Bergman, Korsholm (FI)

(73) Assignee: Wartsila Technology Oy AB, Helsinki (FI)

( * ) Notice: Subject to any disclaimer, the term of this patent is extended or adjusted under 35 U.S.C. 154(b) by 98 days.

(21) Appl. No.: 09/775,523

(22) Filed: Feb. 1, 2001

(65) Prior Publication Data

US 2001/0015273 A1 Aug. 23, 2001

(30) Foreign Application Priority Data

Feb. 1, 2000 (FI) .............................. 20000201

(51) Int. Cl.[7] .............................................. F23L 15/02
(52) U.S. Cl. ....................................... 165/232; 165/9.3
(58) Field of Search .......................... 165/232, 54, 9.3, 165/4, 95

(56) References Cited

U.S. PATENT DOCUMENTS

| | | | | |
|---|---|---|---|---|
| 2,763,132 A | * | 9/1956 | Jue | |
| 3,732,703 A | * | 5/1973 | Nordstrom et al. | |
| 3,777,807 A | * | 12/1973 | Carroll | 165/232 |
| 3,903,963 A | | 9/1975 | Fuki et al. | |
| 4,102,390 A | * | 7/1978 | Harnish et al. | 165/232 |
| 4,122,892 A | * | 10/1978 | Delaporte | 165/232 |
| 4,175,614 A | | 11/1979 | Huggins | 165/95 |
| 4,577,677 A | | 3/1986 | Ezzell | |
| 4,593,748 A | | 6/1986 | Kramb | |
| 4,693,305 A | * | 9/1987 | Fujimoto et al. | 165/95 |
| 4,729,089 A | * | 3/1988 | Bench et al. | 165/232 X |
| 4,760,875 A | * | 8/1988 | Gibson et al. | 165/4 |
| 4,865,856 A | * | 9/1989 | Groen | |
| 4,869,209 A | | 9/1989 | Young | 122/379 |
| 4,901,789 A | * | 2/1990 | Hengelmolen | 165/4 X |
| 4,909,307 A | * | 3/1990 | Besik | 165/4 |
| 5,088,282 A | | 2/1992 | Kramb | 60/274 |
| 5,257,736 A | * | 11/1993 | Roy | 165/232 X |
| 5,515,909 A | * | 5/1996 | Tanaka | 165/4 |
| 5,576,218 A | * | 11/1996 | Zurek et al. | |
| 5,628,629 A | * | 5/1997 | Mitani et al. | 165/4 X |
| 5,799,728 A | * | 9/1998 | Blume | 165/232 X |
| 5,839,894 A | | 11/1998 | Schedler et al. | |
| 5,865,033 A | * | 2/1999 | Gossler | |
| 5,974,807 A | * | 11/1999 | Gao et al. | 165/4 X |
| 5,987,906 A | * | 11/1999 | Hallett | |
| 6,067,815 A | * | 5/2000 | James | |
| 6,082,128 A | * | 7/2000 | Lake et al. | |
| 6,129,139 A | * | 10/2000 | De Clerc | 165/9.3 |
| 6,169,849 B1 | * | 1/2001 | Schmidt | 165/54 X |

FOREIGN PATENT DOCUMENTS

WO          00/68631          11/2000

* cited by examiner

Primary Examiner—Ljiljana Ciric
(74) Attorney, Agent, or Firm—John Smith-Hill; Smith-Hill and Bedell

(57) ABSTRACT

Apparatus for recovering heat from a gas flow defines a heat transfer space through which the gas flow can be directed, the heat transfer space having a first region and a second region, a gas inlet and a gas outlet. A first valve arrangement alters the direction of gas flow through the heat transfer space, the first valve arrangement having a first condition in which the first region is upstream of the second region and a second condition in which the second region is upstream of the first region. First and second heat exchangers are disposed in the first and second regions respectively of the heat transfer space. A second valve arrangement connects each heat exchanger selectively either to a first heat transfer medium flow circuit or to a second heat transfer medium flow circuit.

22 Claims, 4 Drawing Sheets

HEAT RECOVERY APPARATUS AND METHOD OF MINIMIZING FOULING IN A HEAT RECOVERY APPARATUS

BACKGROUND OF THE INVENTION

This invention relates to a heat recovery apparatus. A heat recovery apparatus may comprise a heat transfer space having a gas inlet and a gas outlet and in which at least two separate heat exchangers are arranged successively in the gas flow direction, as well as at least two separate heat transfer medium flow circuits. This kind of heat transfer apparatus provides advantageous heat transfer from a gas flow containing impurities.

The invention relates also to a method of operating a heat recovery apparatus, which method is effective to minimize fouling in a the heat recovery apparatus.

Utilization of heat recovery in order to recover energy from hot gases is commonly known and is beneficial. However, hot gases typically contain various impurities, the nature of which depends on the origin of the hot gases. For example a considerable amount of hot gas is generated in operation of a heat engine and the combustion gases contain various impurities, for example soot and condensable components such as hydrocarbons, depending on the fuel used in the engine.

U.S. Pat. No. 4,869,209 shows an automatic programmable cleaning system for heat exchange tubes of a waste heat boiler. For removing deposits from surfaces of the heat exchange tubes, it is suggested to spray water intermittently into the hot gas flow, whereby the soot that is removed is carried along with the exhaust gases out of the boiler. However, this kind of method is not suitable for general use. Further, evaporating the water consumes the energy of the gas, and the water consumption and the need for maintenance also affects the serviceability of the method.

It is of great importance that the heat transfer surfaces of the exhaust gas boiler of a combustion engine should be clean, in order to maintain efficiency, but it has been observed that these boilers tend to foul rapidly. In connection with state of the art combustion engines, and specifically with installations in which the combustion gases contain condensable components, for example hydrocarbons, as may be the case with gas engines, it may be necessary to clean the heat transfer surfaces as frequently as every 500 hours. Specifically, when the heat is recovered at different temperature levels, and condensation takes place especially in the last heat transfer stage on heat exchanger surfaces at lower temperatures, the efficiency of heat transfer decreases rapidly. In this kind of installation, the cleaning of the heat exchanger operating at lower temperature is accomplished in practice by emptying the heat exchangers, whereby its temperature may rise. This causes the condensable components in question to become soft (or melt) and drain down away from heat exchanger surfaces. However, this procedure may decrease the efficiency of heat recovery because during the cleaning operation, which may take approximately 8 hours, heat is not recovered by the heat exchanger in question. Further, the need to empty the heat exchanger may in some cases impose demands with respect to its material and construction, specifically due to the fact that being uncooled, its temperature may rise to a higher level than would be desirable. In that case also there is a risk of boiler fire.

In order to maintain the efficiency of heat recovery at an adequately high level and generally to maintain the equipment in an optimal operating state, the heat transfer surfaces must be kept clean by regular cleansing. Various methods and devices for this purpose are known from the prior art, but they still include many restrictions and may be inadequate with respect to their operation.

SUMMARY OF THE INVENTION

It is an object of the invention to provide a heat recovery apparatus and method, by means of which it is possible to improve the state of the art and minimize the before mentioned and other problems of the prior art.

In an embodiment of the invention, the heat recovery apparatus comprises a heat transfer space having a gas inlet and a gas outlet and in which at least two separate heat exchangers have been provided successively in the gas flow direction, as well as at least two separate heat transfer circuits. The apparatus also comprises means for altering the direction of gas flow in the heat transfer apace and mean; for connecting each heat transfer circuit selectively to either of the at least two separate heat exchangers. This embodiment is specifically suitable for heat recovery from gases containing sticky, adhesive components, such as condensable hydrocarbons.

In this case, for example in connection with a gas engine operating in accordance with the Otto cycle, when the heat transfer circuits are operating at different temperature levels, such that thee temperature level of the gas before entering a heat exchanger connected to a first heat transfer circuit is typically 350–450° C. and after a heat exchanger connected to a second heat transfer circuit is typically 180–200° C., and as the heat transfer circuits operate typically at temperature level of, on average 60—100° C., it is possible to provide an arrangement in which, after the heat transfer surfaces have become fouled, specifically through condensation of hydrocarbons, to an excessive level, or otherwise when desired, the mode of operation of the apparatus may be altered as will be described in following.

The heat recovery apparatus in accordance with the invention preferably includes a heat transfer space, which comprises two parallel flow ducts, each of which contains at least one heat exchanger and which flow ducts abut at their other ends on a common space.

The present invention provides distinct benefits compared to the prior art. Firstly, the method is very effective compared for example to cleaning by water, which does not have much effect on deposits formed by condensed hydrocarbons. Additionally the cleaning of the heat transfer surfaces is done during the normal operation, whereby there is substantially no interference with the heat recovery. Further, there are no heat losses due to evaporation of cleaning water. Thus, by means of the present invention the heat exchangers can be maintained especially clean, since the change of the mode of the operation may be done always according to the need without impairing the operation. Additionally the present invention does not consume any additional agent for cleaning and also wearing of parts is minimized.

BRIEF DESCRIPTION OF THE DRAWINGS

In the following, the invention is described, by way of example, with reference to the attached drawings, in which.

DETAILED DESCRIPTION

Figure 1:
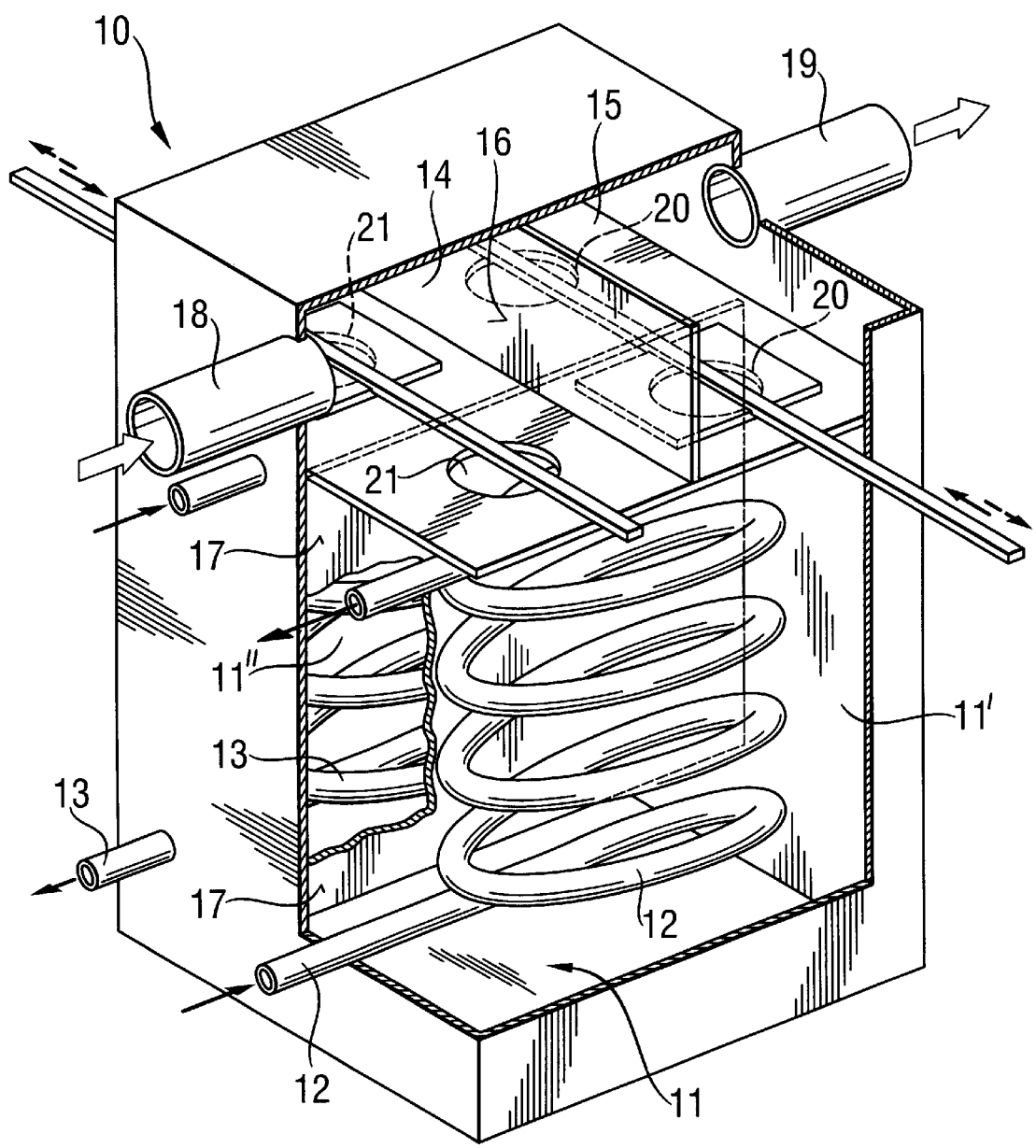
FIG. 1 shows diagrammatically an apparatus in accordance with the present invention.

In FIG. 1 there is shown a waste heat recovery boiler 10, including wall structures surrounding a heat transfer space 11. The heat transfer space 11 is preferably arranged substantially vertical and it comprises preferably two parallel flow ducts 11', 11", which abut at their other ends, here at their lower ends, on a common space. The ducts 11', 11" are separated by a vertical intermediate wall 17. At least one heat exchanger 12, 13 is arranged in each of the parallel ducts. The heat exchangers have heat transfer surfaces of substantially equivalent heat transfer capability. For example, their surface areas may correspond or they may be otherwise arranged so that their operation corresponds to each other. There may also be other heat exchangers and such are preferably located between the heat exchangers 12 and 13 in the gas flow direction.

Correspondingly at their other ends the ducts 11', 11" abut on a means for altering the direction of gas flow, which means here comprises two chambers 14, is separated from each other by a partition wall 16. It should be noted that the plane of the partition wall 16 is inclined to the plane of the intermediate wall 17 limiting the flow ducts 11', 11". The partition wall 16 prevents direct flow communication between the gas inlet 18 and the gas outlet 19. The gas inlet 18 is in operational connection with gas production equipment 2 (shown in FIGS. 2, 3 and 4). Advantageously the gas production equipment may be a piston engine utilizing gaseous fuel, in view of the consistence of and temperature level of the gases from such engine. The wall structures of the heat transfer space 11 operate also as walls limiting the chambers 14, 15, whereby the apparatus is constructed as an integrated unit. The walls limiting the chambers 14, 15, including the partition wall 16 and the intermediate wall 17, may be constructed for example as cooled walls, whereby these walls also include heat transfer surfaces. Additionally, being substantially vertical, the ducts 11', 11" may easily he ventilated for removing hot exhaust gases on shut-down, for example for maintenance.

The chambers 14 and 15 are selectively connectable to the flow ducts 11' and 11" so that gas is caused to pass always through the two ducts in series. This is accomplished by means of the valves 20, 21 provided in the chambers 14, 15. In the figure the valves are illustrated as slide-type valves, by means of which the opening from the chamber 14 to one of the ducts 11', 11" is open and the other opening is closed, and similarly for the chamber 15. The valves may also be of a different type, such as butterfly-valves. The valves should be positively controlled so that each chamber 14 or 15 may be connected to only one of the ducts 11', 11" at a time, and so that the gas will always pass through the two ducts in series. The flow control of the gas by the slide valves 20, 21 shown in the figure takes place by executing a pull or push movement of the shaft of the valves.

Figure 2:
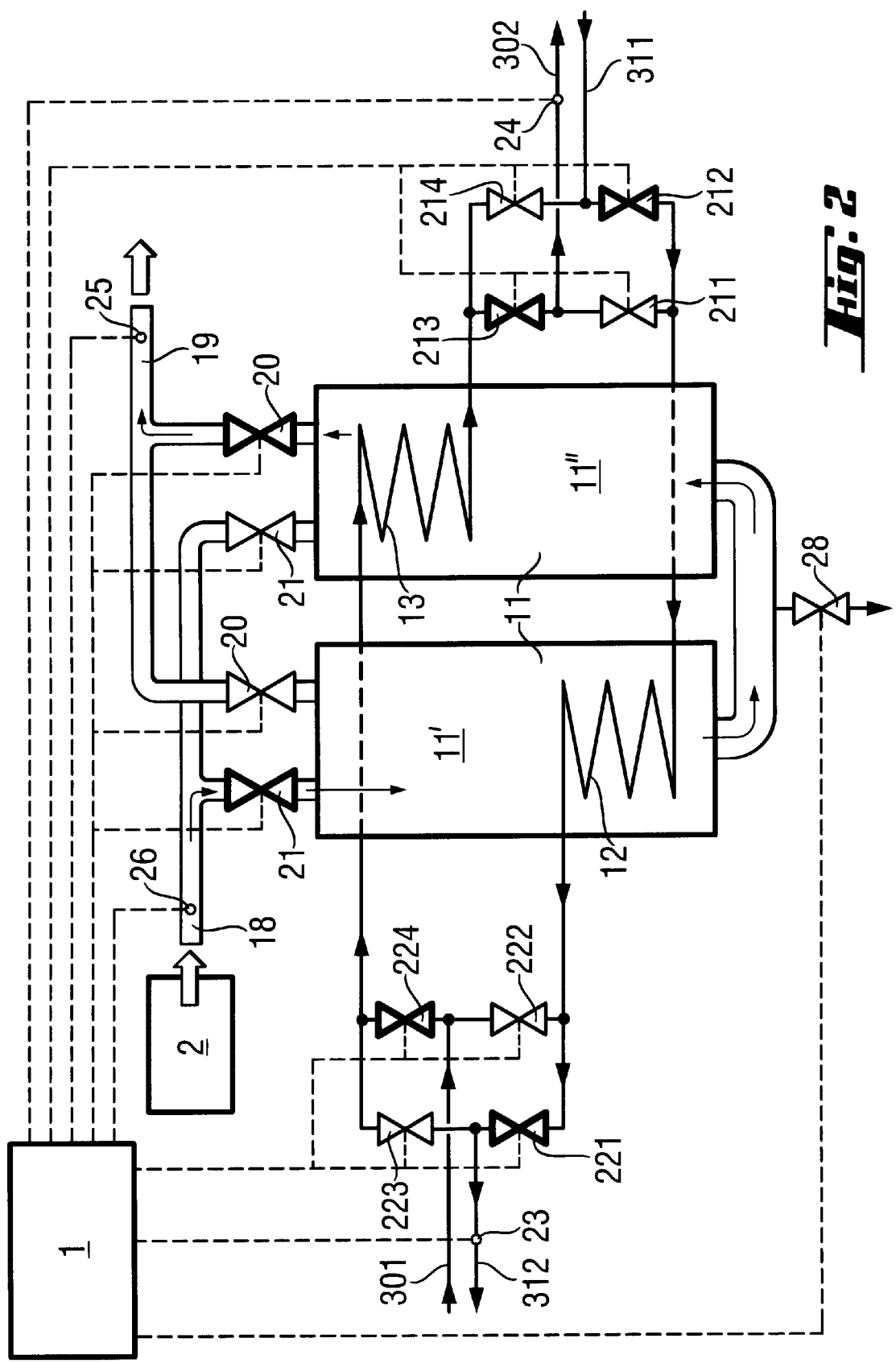
FIG. 2 shows schematically an apparatus in accordance with the invention in its first mode of operation.

Operation of the apparatus will be described in the following with reference to FIG. 2. FIG. 2 illustrates several valves. Valves that are open are illustrated by thicker lines than valves that are closed. The gas is caused to flow from the gas production equipment 2 to the gas inlet 18. After passing through the gas inlet 18, the gas flow is guided in a respective desired manner into the heat transfer space 11. In a first mode of operation shown herein, the valve 21 directs the gas into the duct 11'. The gas flows in the duct 11' substantially vertically downwards and passes the heat exchanger 12 transferring heat to heat transfer medium flowing in the heat exchanger. As can be seen from FIG. 2, the heat exchanger 12 is connected to a first heat transfer circuit 311, 312, which operates at higher temperature level than a second heat transfer circuit 301, 302. The first heat transfer circuit will be also referred to as the HT-circuit and the second heat transfer circuit will be referred to as the LT-circuit. The apparatus thus comprises valves 212, 214, 221, 223, 222, 244, 211, 213 for connecting the heat transfer circuits selectively to the heat exchangers 12, 13. The heat transfer medium from the first heat transfer circuit 311, 312 is guided under control of the valves 212, 214 either to the heat exchanger 12 located in the duct 11' or to the heat exchanger 13 located in the duct 11". In the first mode of operation, which is shown in FIG. 2, the valve 212 is open and valve 214 is closed. The heat transfer medium is thus guided to the heat exchanger 12 located in the duct 11', which heat exchanger 12 is upstream in the gas flow. The heat transfer medium is guided back to the first heat transfer circuit under control of valves 221 and 223. In the first mode of operation, the valve 221 is open and valve 223 is closed.

After passing the heat exchanger 12, the gas enters the common space connecting the flow ducts 11', 11", from which it passes to the second flow duct 11" by changing its flow direction about 180° upwards. The gas flows upwards in the duct 11" through the heat exchanger 13 transferring heat to the heat transfer medium flowing in the heat exchanger. As can be seen from FIG. 2, the heat exchanger 13 is connected to the second heat transfer circuit 301, 302, which operates at a lower temperature level than the first heat transfer circuit 311, 312. The heat transfer medium from the second heat transfer circuit 301, 302 is guided under control of valves 222 and 224 either to the heat exchanger 12 located in the duct 11' or to the heat exchanger 13 located in duct 11". In the first mode of operation the valve 222 is closed and the valve 224 is opened, whereby the second heat transfer medium is guided to the heat exchanger 13 in the duct 1111, which heat exchanger is downstream in the gas flow. The apparatus is operated in this first mode of operation for a desired period of time or advantageously until the mode of operation is altered based on a predetermined event.

The predetermined event comprises preferably the following. During the operation of the apparatus, measurement information is collected by a central processing unit 1 at least from the heat transfer process. The collected measurement information is compared with set values, which have been stored in or are available to the central processing unit 1, and in the event that the measured information differs from the set values by more than a predetermined amount, the mode of operation of the arrangement is altered. Information regarding the heat transfer media is collected by temperature senders 23, 24 provided in the heat transfer medium channels and/or information regarding gas pressure difference and/or gas temperature is collected by pressure and/or temperature senders 25, 26 provided in the gas flow channels to be used as measurement information. Thus, when for example the pressure difference of gas flow increases beyond a set value or the temperature of heat transfer medium coming from a heat exchanger is not at a predetermined level, the mode of operation is altered.

Figure 3:
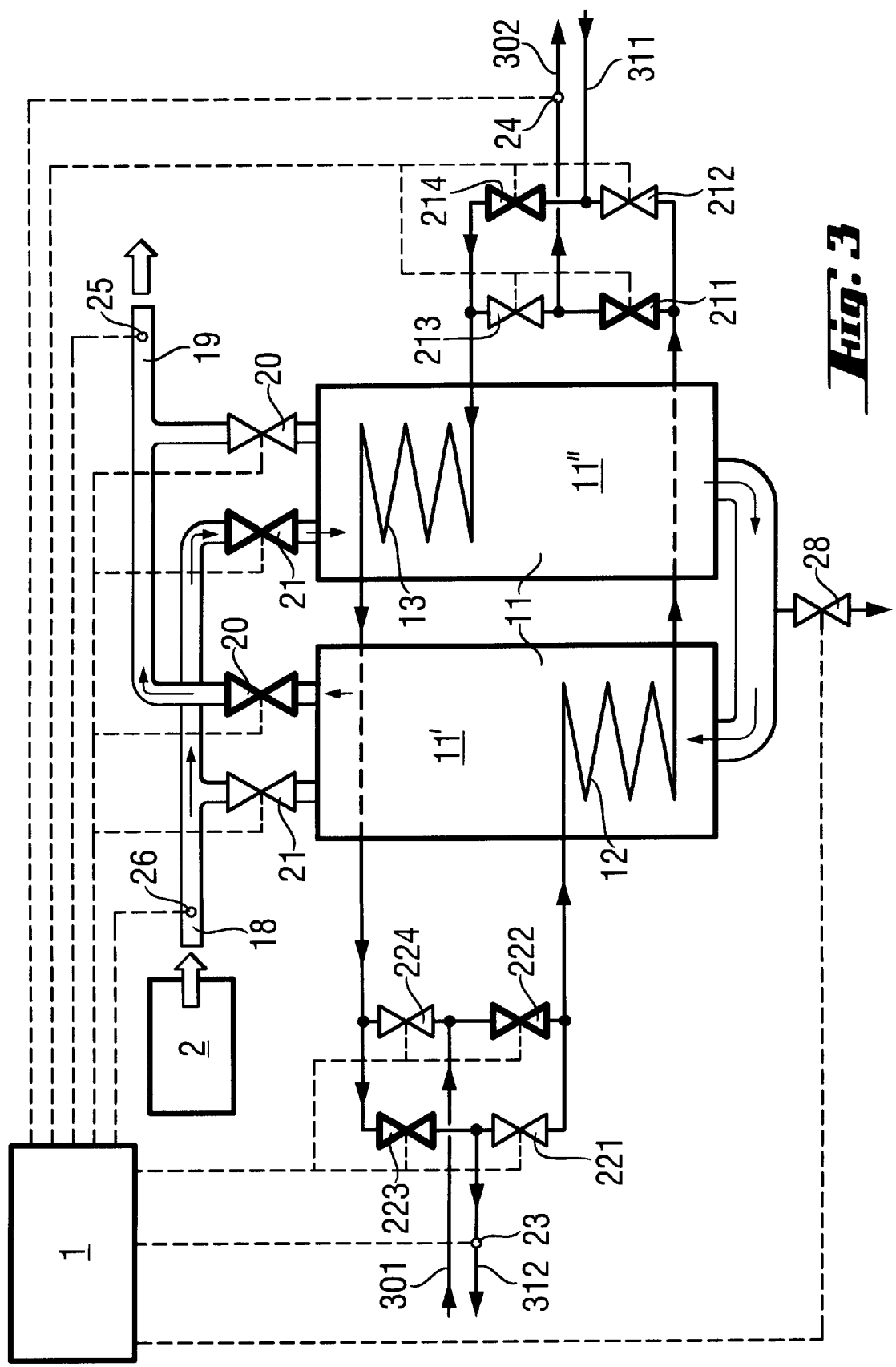
FIG. 3 shows schematically the apparatus of FIG. 2 in its second mode of operation.

FIG. 3 shows the second mode of operation, which will be described in the following. The gas supplied to the apparatus is now caused to flow from the gas production equipment 2 through the gas inlet 18 to the duct 11". Gas flows in the duct 11" substantially vertically downwards and passes the heat exchanger 13 transferring heat to heat transfer medium flowing in the hear exchanger. As can be seen from FIG. 3, the heat exchanger 13, which was connected to the LT-circuit 301, 302 during the first mode of operation, is now connected to the HT-circuit 311, 312 whereby a cleaning effect of heat transfer surfaces according to the invention is provided. The deposits that accumulated on the surfaces of the heat exchanger when operating in the first mode soften. Especially, when the apparatus is used for heat recovery from exhaust gases of a gas engine, components that condense and harden on a relatively cool heat transfer surface of the heat exchanger 13 in the first mode of operation soften and drain down from the heat transfer surface of the heat exchanger, where from they can be removed from the apparatus through a discharge valve 28, which is preferably controlled by the central processing unit 1 for example so that the valve is opened during a selected interval after each change in mode of operation.

The heat transfer medium of the HT-circuit 311, 312 is guided through the open valve 214 of the valve pair 212, 214 to the heat exchanger 13 in the duct 11", which is now upstream in the gas flow. The heat transfer medium is guided back to the first haet transfer medium circuit under control of the open valve 223 of the valve pair 221, 223.

After passing the heat exchanger 13, the gas enters the common space connecting the flow ducts 11', 11", from which space the gas is guided further upwards through the flow duct 11' by changing its flow direction through 180λ. In this duct, the gas flows upwards through the heat exchanger 12 and transfers heat to the heat transfer medium flowing in the heat exchanger 12. As can be seen from FIG. 3, the heat exchanger 12 is connected to the second heat transfer circuit i.e. to the LT-circuit 301, 302. The heat transfer medium of the LT-circuit 301, 302 is guided through the open valve 222 of the valve pair 222, 244 to thee heat exchanger 12 in the duct 11', which heat exchanger is now downstream in the gas flow. The arrangement is now operated in this second mode of operation for a desired period of time or advantageously until the mode of operation is altered again based on a predetermined event.

A controllable central processing unit 1 or the like is provided for controlling the operation of the valves. The operation of the valves 20, 21 guiding the gas flow is synchronized with valves 211, 212, 213, 214, 221, 222, 223, 224 guiding the heat transfer medium so that the valves of each chamber 14, 15 are positively controlled so that a flow connection from a chamber may be established with only one of the flow ducts 11', 11" at a time, the gas is always caused to pass through both of the ducts 11', 11", and the HT-circuit is always connected with the heat exchanger that is upstream of the heat exchanger connected to the lt-circuit.

Figure 4:
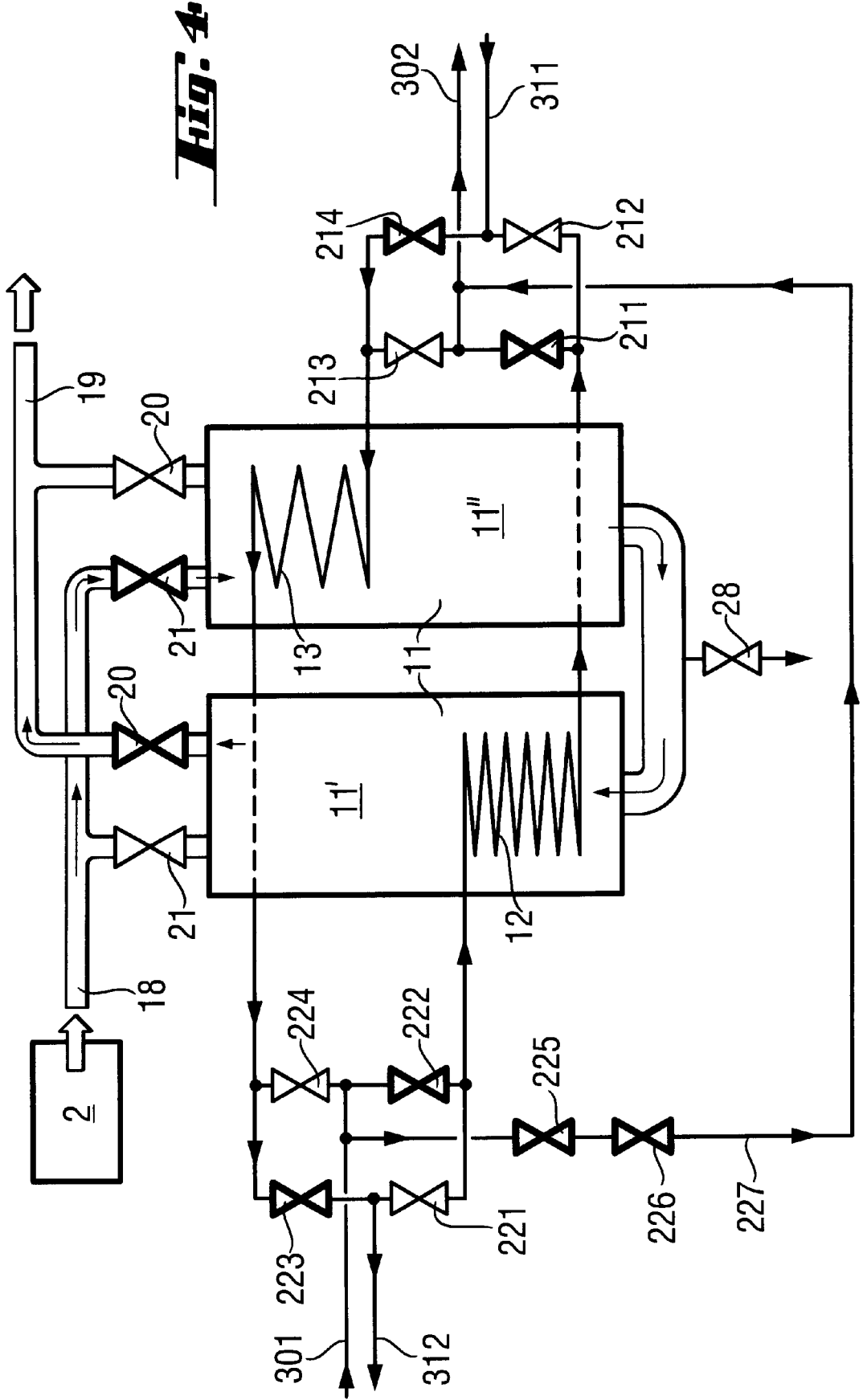
FIG. 4 shows schematically a modified form of the apparatus of FIG. 2 in its second mode of operation.

FIG. 4 shows a modification of the apparatus shown in FIGS. 2 and 3. In the case of the apparatus shown in FIG. 4, the heat transfer surface of the first heat exchanger 12 is larger than that of the second heat exchanger, so that in the first mode of operation heat is transferred more effectively to the first heat transfer medium than to the second heat transfer and the first heat transfer medium is heated to a higher temperature than the second heat transfer medium. In the second mode of operation, in which the second heat transfer medium flows through the first heat exchanger 12, some of the heat transfer medium of the LT-circuit may be guided to bypass the first heat exchanger via a conduit 227. The by-pass flow rejoins the flow through the heat exchanger 12 downstream of the valve 211. The temperature of the second heat transfer medium, after mixing the by-pass flow and the flow through the heat exchanger 12, corresponds to the situation when operating in the first mode of operation. The flow of gas in this case corresponds to that shown in FIG. 3.

The heat exchanger 13 is now connected to the first heat transfer circuit i.e. the HT-circuit 311, 312. According to FIG. 4, in order to compensate or offset the greater power obtained by the larger surface area of the heat exchanger 12, a part of the heat transfer medium of the LT-circuit 301, 302 may be guided to bypass the heat exchanger 12 through the conduit 227. The conduit 227 is advantageously provided with a closing or shut-off valve 225 and control valve 226, by means of which the flow rate may be adjusted. The arrangement is operated in the second mode of operation for the time required for cleaning of the heat exchanger 13, after which the mode of operation is changed again.

The foregoing disclosure is merely one possibility to implement the arrangement with heat transfer circuits, and in addition the heat transfer circuits may be provided with separate loops operated by circulation pumps. In this manner the inlet and outlet flows of the separate loops may be separately adjusted (not shown).

A corresponding effect may also be achieved by guiding the gas-side flow by altering the position of the valve so that some gas bypasses the heat exchanger directly through heat exchanger space from chamber 14 to chamber 15. This may be accomplished for example so that the pair of openings, which is in principle required to be closed by each mode of operation, is not totally closed, but both of the valve openings in the chamber are left partly open by the valves 20, 21 (FIG. 1).

In some cases, for example in order to ensure monitoring of the apparatus during the operation, it may be advantageous to perform the cleaning, i.e. change the mode of operation, by operating fully manually.

The invention is not limited to the illustrated embodiments but several modifications of the invention are reasonable within the scope of the attached claims. The heat exchanger apparatus may be designed to operate in an orientation that is inverted with respect to that shown, and the ducts 11', 11" are above the chamber 14, 15. The heat exchangers may, as to their actual connections to the heat transfer medium circuit, operate either as parallel, counter or cross flow type. The apparatus may also comprise other heat exchangers and heat transfer circuits.

What is claim is:

1. Apparatus for recovering heat from a gas flow comprising:
   a means defining a heat transfer space having a first region and a second region,
   a first valve means for directing the gas flow through the heat transfer space, the first valve means having a first operating condition in which the gas flows through the heat transfer space in a first direction such that the first region is upstream of the second region and a second operating condition in which the gas flows through the heat transfer space in a second direction such that the second region is upstream of the first region,
   first and second heat exchangers disposed in the first and second regions respectively of the heat transfer space, and
   a second valve means for connecting each heat exchanger selectively either to a first heat transfer circuit or to a second heat transfer circuit.

2. Heat recovery apparatus according to claim 1, wherein the heat exchangers have respective heat transfer surfaces of substantially corresponding heat transfer capability.

3. Heat recovery apparatus according to claim 1, wherein the gas flows in a vertical direction in at least part of the heat transfer space.

4. Heat recovery apparatus according to claim 1, wherein the heat transfer apace comprises first and second flow ducts in which the first and second heat exchangers are respectively disposed.

5. Heat recovery apparatus according to claim 4, wherein the first and second flow ducts each have first and second ends, the flow ducts being connected to each other and to the first valve means so that the first end of each duct is upstream of the second end thereof with respect to the first flow direction.

6. Heat recovery apparatus according to claim 5, wherein the first and second flow ducts are parallel and extend upwards from a chamber to which the first flow duct is connected at its second end and to which the second flow duct is connected at its first end, and the apparatus further comprises a discharge valve connected to the chamber for draining material from the chamber.

7. Heat recovery apparatus according to claim 4, comprising a gas inlet and a gas outlet connected to the flow ducts by the first valve means.

8. Heat recovery apparatus according to claim 7, wherein the first valve means connects the gas inlet to the first flow duct and the gas outlet to the second flow duct in the first operating condition of the first valve means and connects the gas inlet to the second flow duct and the gas outlet to the first flow duct in the second operating condition of the first valve means.

9. Heat recovery apparatus according to claim 7, wherein
the means defining the heat transfer space also defines an inlet chamber connected to the gas inlet and an outlet chamber connected to the gas outlet,
the first valve means includes an inlet valve for connecting the inlet chamber selectively to either flow duct and an outlet valve for connecting the outlet chamber selectively to either flow duct, and
the second valve means has a first operating condition in which the first and second heat exchangers are connected to the first and second heat flow circuits respectively and a second operating condition in which the first and second heat exchangers are connected to the second and first heat transfer circuits respectively.

10. Heat recovery apparatus according to claim 9, wherein the inlet valve defines a first opening between the inlet chamber and the first flow duct and second opening between the inlet chamber and the second flow duct, the outlet valve defines a third opening between the outlet chamber and the first flow duct and a fourth opening between the outlet chamber and the second flow duct, in the first operating condition of the first valve means the second and third openings are blocked and the first and fourth openings are not blocked, and in the second operating condition of the first valve means the first and fourth openings are blocked and the second and third openings are not blocked, and the apparatus comprises a control means for controlling the operation of the first valve means and the second valve means so that the second valve means is in the first operating condition when the first valve means is in the first operating condition and the second valve means is in the second operating condition when the first valve means is in the second operating condition.

11. Heat recovery apparatus according to claim 9, wherein the second heat transfer medium flow circuit includes a heat exchanger bypass conduit.

12. Apparatus for recovering heat from a gas flow comprising:
a means defining a heat transfer space through which the gas flow can be directed, the heat transfer space having a first region and a second region,
a first valve means for directing the gas flow through the heat transfer space, the first valve means having a first operating condition in which the gas flows through the heat transfer space in a first direction such that the first region is upstream of the second region and a second operating condition in which the gas flows through the heat transfer space in a second direction such that the second region is upstream of the first region,
first and second heat exchangers disposed in the first and second regions respectively of the heat transfer space,
first and second heat transfer circuits, and
a second valve means having a first operating condition in which the second valve means connects the first and second heat exchangers to the first and second heat transfer circuits respectively and a second operating condition in which the second valve means connects the first and second heat exchangers to the second and first heat transfer circuits respectively.

13. Heat recovery apparatus according to claim 12, wherein the heat exchangers have respective heat transfer surfaces of substantially corresponding heat transfer capability.

14. Heat recovery apparatus according to claim 12, wherein the gas flows in a vertical direction in at least part of the heat transfer space.

15. Heat recovery apparatus according to claim 12, wherein the heat transfer space comprises two parallel flow ducts in which the heat exchangers are respectively disposed.

16. Heat recovery apparatus according to claim 15, comprising a gas inlet and a gas outlet connected to the flow ducts by the first valve means.

17. Heat recovery apparatus according to claim 12, wherein the heat transfer apace comprises first and second parallel flow ducts in which the first and second heat exchangers are respectively disposed, the apparatus comprises a gas inlet and a gas outlet, and the first valve means connects the gas inlet to the first flow duct and the gas outlet to the second flow duct in the first operating condition of the first valve means and connects the gas inlet to the second flow duct and the gas cutlet to the first flow duct in the second operating condition of the first valve means.

18. Heat recovery apparatus according to claim 16, wherein
the means defining the heat transfer space also defines an inlet chamber connected to the gas inlet and an outlet chamber connected to the gas outlet, and
the first valve means includes an inlet valve for connecting the inlet chamber selectively to either flow duct and an outlet valve for connecting the outlet chanter selectively to either flow duct.

19. Heat recovery apparatus according to claim 18, comprising a control means for controlling the operation of the first valve means and the second valve means so that the inlet chamber and the outlet chamber are each connected to only one flow duct at a time and the gas supplied by the gas inlet always passes through both ducts and the second valve means is in the first operating condition when the first valve means is in the first operating condition and the second valve means is in the second operating condition when the first valve means is in the second operating condition.

20. Heat recovery apparatus according to claim 18, wherein the second heat transfer medium flow circuit includes a heat exchanger bypass conduit.

21. A method of operating a heat recovery apparatus that comprises a means defining a heat transfer space through which a gas flow can be directed, the heat transfer space having a first region and a second region, first and second heat exchangers disposed in the first and second regions respectively of the heat transfer space, and first and second heat transfer circuits, wherein the method comprises:

operating the apparatus in a first mode in which the gas flows through the first and second regions of the heat transfer space in a first direction, with the first region being upstream of the second region with respect to the direction of gas flow, the heat transfer medium of the first heat transfer circuit flows through the first heat exchanger and the heat transfer medium of the second heat transfer circuit flows through the second heat exchanger, and subsequently operating the apparatus in a second mode in which the gas flows through the first and second regions of the heat transfer space in a second direction, with the second region upstream of the first region with respect to the direction of gas flow, the heat transfer medium of the first heat transfer circuit flows through the second heat exchanger and the heat transfer medium of the second heat transfer circuit flows through the first heat exchanger.

22. A method according to claim 21, comprising, while operating in the first mode:

(a) measuring the value of a variable that characterizes heat transfer from the gas flow to a heat transfer medium, (b) comparing the measured value with a first set value, (c) if the measured value differs from the first set value by an amount that exceeds a predetermined threshold, changing the mode of operation from the first mode of operation to the second mode of operation, (d) repeating step (a), (e) comparing the measured value from step (d) with a second set value, and (f) if the measured value from step (d) differs from the second set value by an amount that exceeds a predetermined threshold, changing the mode of operation from the second mode of operation to the first mode of operation, and wherein the heat transfer space has a gas inlet and a gas outlet and step (a) comprises measuring gas pressure difference between the gas inlet and the gas outlet, or gas temperature downstream of the heat exchangers, or temperature of the heat transfer medium leaving the heat exchanger that is in the downstream region of the heat transfer space with respect to the direction of gas flow.

* * * * *